US012042957B2

(12) United States Patent
Dussardier et al.

(10) Patent No.: US 12,042,957 B2
(45) Date of Patent: Jul. 23, 2024

(54) OUTPUT MECHANISM OF A MIXER WITH CONVERGING CONICAL TWIN SCREWS (71) Applicant: COMPAGNIE GENERALE DES ETABLISSEMENTS MICHELIN, Clermont-Ferrand (FR)

(72) Inventors: Bruno Dussardier, Clermont-Ferrand (FR); Aurelien Tournebize, Clermont-Ferrand (FR); Thierry Ablonet, Clermont-Ferrand (FR); Randria Tsilavo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 328 days.

(21) Appl. No.: 17/436,507

(22) PCT Filed: Jan. 28, 2020

(86) PCT No.: PCT/EP2020/052035
§ 371 (c)(1),
(2) Date: Sep. 3, 2021

(87) PCT Pub. No.: WO2020/177951
PCT Pub. Date: Sep. 10, 2020

(65) Prior Publication Data
US 2022/0176591 A1    Jun. 9, 2022

(30) Foreign Application Priority Data

Mar. 6, 2019    (FR) ........................................ 1902283

(51) Int. Cl.
*B29C 48/07*    (2019.01)
*B29B 7/18*    (2006.01)
(Continued)

(52) U.S. Cl.
CPC ............. *B29B 7/7495* (2013.01); *B29B 7/186* (2013.01); *B29B 7/20* (2013.01); *B29B 7/26* (2013.01);
(Continued)

(58) Field of Classification Search
CPC .......................... B29C 48/301; B29C 48/302
See application file for complete search history.

(56) References Cited

U.S. PATENT DOCUMENTS

| 1,370,398 A | 3/1921 | Banbury |
| 2,466,934 A * | 4/1949 | Dellenbarger .......... B29B 7/489 425/182 |

(Continued)

FOREIGN PATENT DOCUMENTS

| CN | 1860010 A | 11/2006 |
| CN | 101842204 A | 9/2010 |

(Continued)

OTHER PUBLICATIONS

First Office Action for application CN 202080018355, Sep. 19, 2022 (Year: 2022).*

(Continued)

*Primary Examiner* — Timothy Kennedy
(74) *Attorney, Agent, or Firm* — VENABLE LLP (57) ABSTRACT A mixing and extrusion machine (10) for the manufacture of rubber mixtures includes a mixer with a converging conical twin-screw (12) with a fixed frame (14) that supports sleeves (16). Two screws (18), being mounted at an angle, are mounted in the mixer (12) in such a way as to move in translational movement between an opening (22) arranged upstream and an outlet (25) arranged downstream of the sleeves. The screws are mounted in the sleeves with removable doors including sliding shutters (40) installed relative to the outlet (25). The sliding shutters move linearly between (Continued)

a closed position, in which the sliding shutters prevent the mixer from discharging the mixture, and an open position, in which the sliding shutters prevent discharge of the mixture through the sides of two counter-rotating rollers (32) of a roller nose type system located just downstream of the outlet.

10 Claims, 4 Drawing Sheets

(51) Int. Cl.
   *B29B 7/20* (2006.01)
   *B29B 7/26* (2006.01)
   *B29B 7/48* (2006.01)
   *B29B 7/58* (2006.01)
   *B29B 7/74* (2006.01)
   *B29B 7/80* (2006.01)
   *B29C 48/00* (2019.01)
   *B29C 48/40* (2019.01)

(52) U.S. Cl.
   CPC .............. *B29B 7/484* (2013.01); *B29B 7/489* (2013.01); *B29B 7/582* (2013.01); *B29B 7/802* (2013.01); *B29C 48/0011* (2019.02); *B29C 48/07* (2019.02); *B29C 48/402* (2019.02)

(56) References Cited

U.S. PATENT DOCUMENTS

| | | | |
|---|---|---|---|
| 3,288,077 A | 11/1966 | Meskat | |
| 3,975,126 A | 8/1976 | Wireman et al. | |
| 4,131,371 A | 12/1978 | Tynan | |
| 4,300,839 A | 11/1981 | Sakagami | |
| 4,702,608 A * | 10/1987 | Garbar | B01F 27/50 366/196 |
| 4,824,256 A | 4/1989 | Haring et al. | |
| 5,967,025 A * | 10/1999 | Tashiro | A21C 11/00 99/450.2 |
| 6,022,133 A | 2/2000 | Herring et al. | |
| 7,404,664 B2 | 7/2008 | Borzenski et al. | |
| 7,556,419 B2 | 7/2009 | Colombo | |
| 8,517,714 B2 | 8/2013 | Matsumoto et al. | |
| 9,463,581 B2 | 10/2016 | Yamaguchi et al. | |
| 10,124,511 B2 | 11/2018 | Renard et al. | |
| 10,259,147 B2 | 4/2019 | Monnereau et al. | |
| 10,471,627 B2 | 11/2019 | Juillard et al. | |
| 11,351,700 B2 | 6/2022 | Le-Bars et al. | |
| 2005/0226093 A1 | 10/2005 | Yada et al. | |
| 2007/0159916 A1 | 7/2007 | Colombo | |
| 2010/0271901 A1 | 10/2010 | Yamaguchi et al. | |
| 2011/0091596 A1 | 4/2011 | Saiuchi et al. | |
| 2011/0123659 A1 | 5/2011 | Matsumoto et al. | |
| 2015/0360398 A1 | 12/2015 | Monnereau et al. | |
| 2017/0165872 A1 | 6/2017 | Renard et al. | |
| 2018/0147746 A1 * | 5/2018 | Inoue | B29B 7/826 |
| 2018/0243945 A1 | 8/2018 | Renard et al. | |
| 2018/0290338 A1 | 10/2018 | Juillard et al. | |
| 2019/0176363 A1 | 6/2019 | Le-Bars et al. | |
| 2022/0152874 A1 | 5/2022 | Dussardier et al. | |
| 2022/0161457 A1 | 5/2022 | Dussardier et al. | |
| 2022/0258379 A1 | 8/2022 | Dussardier et al. | |

FOREIGN PATENT DOCUMENTS

| | | | |
|---|---|---|---|
| CN | 102056722 A | 5/2011 | |
| CN | 105365066 A | 3/2016 | |
| CN | 108349114 A | 7/2018 | |
| DE | 39 20 422 A1 | 1/1991 | |
| DE | 10 2016 013 785 A1 | 6/2007 | |
| DE | 10 2007 033 355 A1 | 3/2008 | |
| EP | 0002131 A1 | 5/1979 | |
| EP | 0160124 A2 | 11/1985 | |
| EP | 0979714 A1 | 2/2000 | |
| EP | 1543930 A2 | 6/2005 | |
| EP | 1552914 A1 | 7/2005 | |
| EP | 3359362 A1 | 8/2018 | |
| FR | 1563077 | 4/1969 | |
| FR | 2282993 A1 | 3/1976 | |
| FR | 3001654 A1 | 8/2014 | |
| FR | 3045173 A1 | 6/2017 | |
| FR | 3051703 A1 | 12/2017 | |
| GB | 1125775 A | 8/1968 | |
| JP | 5-50425 A | 3/1993 | |
| JP | 2006-231582 A | 9/2006 | |
| JP | 2006-305976 A | 11/2006 | |
| JP | 2009-12463 A | 1/2009 | |
| JP | 2010-264606 A | 11/2010 | |
| JP | 2011-73428 A | 4/2011 | |
| JP | 2014-172230 A | 9/2014 | |
| JP | 2015-205402 A | 11/2015 | |
| WO | 2005/039847 A1 | 5/2005 | |
| WO | 2009/057753 A1 | 5/2009 | |
| WO | WO-2015190340 A1 * | 12/2015 | B29B 7/90 |
| WO | 2016/107527 A1 | 7/2016 | |
| WO | WO-2017093854 A1 * | 6/2017 | B29B 7/18 |
| WO | 2019/162803 A1 | 8/2019 | |

OTHER PUBLICATIONS

B. Vergnes, et al., "Extrusion-Twin-Screw Extrusion Processes", Materiaux—Plastiques et composites, 28 pages (Jan. 2001) with English abstract.

International Search Report dated Apr. 3, 2020, in corresponding PCT/EP2020/052035 (3 pages).

* cited by examiner

OUTPUT MECHANISM OF A MIXER WITH CONVERGING CONICAL TWIN SCREWS

TECHNICAL FIELD

The invention concerns mixers used in the field of production of rubber mixtures. More specifically, the invention concerns the output mechanisms of a mixer with a converging conical screw to preserve the closure and sealing of the mixer.

BACKGROUND

In the field of production of rubber mixtures, there are already existing screw mixing and extrusion machines. These machines include twin screw extruders, each having a chassis with common assembled parts. The assembled parts may include, without limitation, a sheath screw assembly (with or without its optional heating and cooling accessories), a drive unit (gearbox and coupling), a main motor, devices for material supply (e. g., dosers or hoppers) or for treatment (e. g., degassing devices), a cutting or shaping device for the extruded material, if applicable, a control cabinet that connects the drives of the motors, start and safety devices, and control, command, display and measurement devices. There are examples of twin screw extruders described in the publication "Extrusion—Twin-Screw Extrusion Processes" by Bruno Vergnes and Marc Chapet, published on Jan. 10, 2001 by *Techniques de l'Ingenieur, traité Plastiques et Composites* ("the Vergnes/Chapet reference").

The chassis often includes a manual or assisted sleeve opening device, allowing easy access to the screws for cleaning, inspection and/or maintenance. The most commonly used opening system consists of a slide that slides the sleeve relative to the screws (for example, of the type offered commercially by Colmec and Pomini TDE). There are also "portfolio" opening systems, where the sheath is articulated around a lateral hinge (typically known as the Farrel continuous mixer, or "FCM"). The sleeve screw assembly is the active part and ensures the treatment of the material. The sheath is the outer envelope. The sleeve is temperature regulated by the combination of a heating system, generally electric, controlled by temperature control probes, with a cooling system, usually with water circulation. Inside the sheath, the two rotating screws consume the material and move it forward.

The screw mixing and extrusion machines that are usually used are made up of rotors (i. e., the screw(s)) and stators (i. e., the sleeves). Such a machine is described by U.S. Pat. No. 7,556,419 which represents an example of a converging conical twin-screw machine with a removable door that closes the outlet. This type of mixer allows the combination of a mixing phase of the raw materials and an evacuation phase of the mixture thanks to a removable door at the exit (this removable door being arranged at the end of the screw). The removable door is closed and locked during the mixing cycle, preventing the mixture from exiting the machine. When the mixing cycle is complete, the removable door is unlocked and opens. The rotating screws can then bring forward the product contained inside the machine.

In order to preserve the closure and sealing of the mixer, the disclosed invention combines the benefits of converging conical twin-screw mixers with the benefits of removable doors with sliding shutters. By using sliding shutters, the disclosed invention makes it possible to control the shape and dimensions of the product as soon as the product leaves the mixer. This type of mixer can be equipped with a roller nose system at the outlet that will allow the product to be discharged in the form of a sheet.

Résumé

The invention concerns a mixing and extrusion machine for the production of rubber mixtures, the machine including a converging conical twin screw mixer with a fixed frame that supports sleeves in which two screws are mounted at an angle between an opening arranged upstream of the sleeves, where an introduction hopper of the machine feeds the screws, and an outlet downstream of the sleeves, where the mixer discharges the mixture at the end of a mixing cycle, one or more motors that rotate the two screws in the sleeves during the mixing cycle, and one or more removable doors provided at the outlet to allow, during the mixing cycle, the discharge and shaping of a rubber mixture. The screws are mounted in the sleeves with removable doors at the end that follow the shape of the screws, the removable doors being sliding shutters installed relative to the outlet so that the sliding shutters move linearly between a closed position, in which the sliding shutters prevent the mixture from leaving the mixer, and an open position, in which the sliding shutters prevent the mixture from escaping through the sides of two counter-rotating rollers of a roller nose system arranged just downstream of the outlet in order to force the mixture to pass between the two rollers and to form a sheet of the mixture of a predefined thickness and width exiting from the mixer.

In an embodiment of the machine, the machine further includes a ram with an inner surface having a shape that is complementary to an outer contour of the two screws, the ram moving inside the introduction hopper between a raised position, where the two screws remain accessible for introducing the mixture, and a lowered position, where the inner surface of the ram forms an upper part of the mixer.

In some embodiments of the machine, the machine also includes one or more mobile sleeves that are arranged towards the outlet, above and below the outlet, each mobile sleeve having a support surface with a predetermined surface area according to an elasticity of the mixture, and the mobile sleeves including mobile elements that move by a linear movement relative to the outlet so as to adjust a predetermined space between the sleeves and the screws, and the linear movement being defined between a closed position of the mobile sleeves that facilitates mixing, and an open position of the mobile sleeves that facilitates the flow of the mixture inside the mixer.

In some embodiments of the machine, the screws are mounted in the mixer so that the crest of each thread of each screw tangentially contacts the surfaces of the opposite screw so that the screws remain substantially in contact with each other when rotating the screws at an angle and at a center distance that allows self-cleaning. In one embodiment, the screws are selected from interpenetrated and conjugated profiles, including interpenetrated co-rotative profiles with conjugated profiles.

In some embodiments of the machine, the sleeves include cooling channels in order to manage the temperature of the mixture during the mixing cycle.

The invention also concerns a mixing process of the type including a step of mixing and extruding a rubber mixture from the disclosed machine. The process includes the following steps:
- a step of rotating the screws forward with the sliding shutters closed;
- a step of introducing the mixture to the machine, during which the screws continue to rotate and the sliding shutters remain closed; and a machine emptying step, during which the sliding shutters open to release mixture from the machine outlet toward a downstream process, and in which the screws continue to rotate until the mixer is empty.

In an embodiment of the process, the step of introducing the mixture to the machine includes the introduction of raw materials to form the mixture.

In an embodiment of the process, the step of introducing the mixture to the machine includes the introduction of one or more masterbatches.

In some embodiments of the process, the sliding shutters are in the closed position at the beginning of the mixing cycle and in the open position at the end of the mixing cycle; and the mobile sleeves are in the open position at the beginning of the mixing cycle and in the closed position at the end of the mixing cycle.

Other aspects of the invention will become evident through the following detailed description.

BRIEF DESCRIPTION OF THE DRAWINGS

The nature and various advantages of the invention will become more apparent when reading the following detailed description, in conjunction with the attached drawings, in which the same reference numbers refer everywhere to identical elements, and in which.

DETAILED DESCRIPTION

Figure 1:
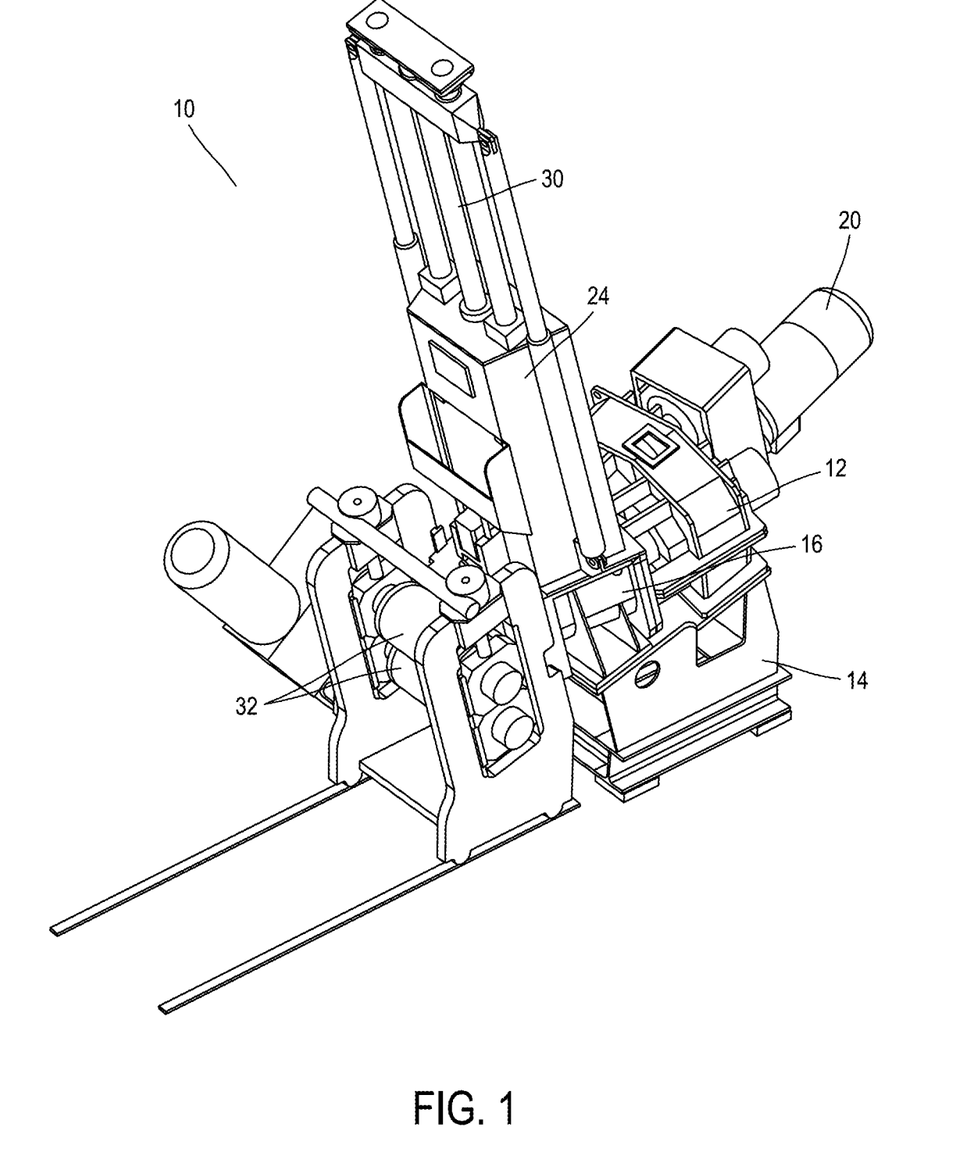
FIG. 1 shows a perspective view of a mixing and extrusion machine of the invention.
Figure 2:
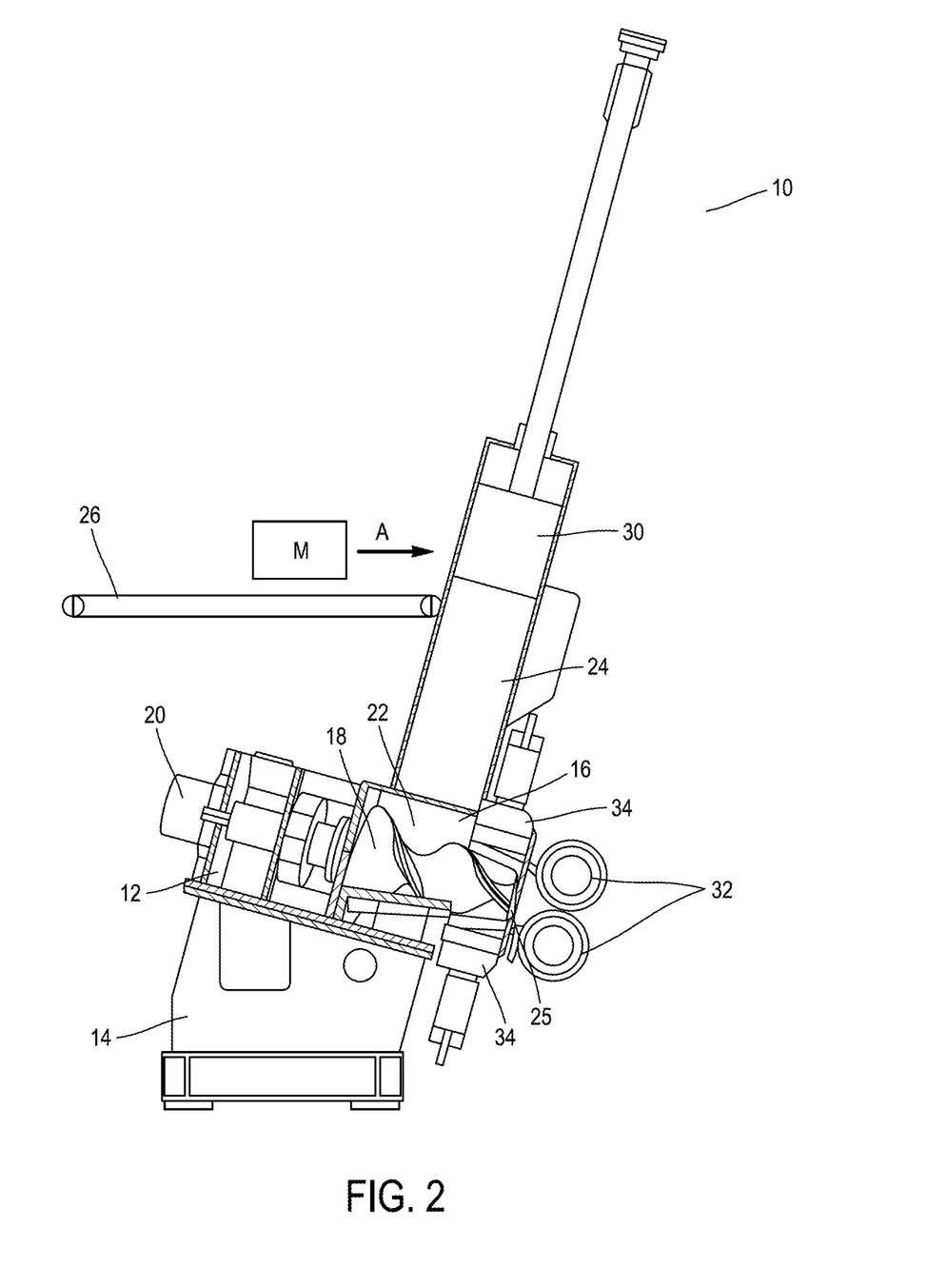
FIG. 2 shows a partial cross-sectional lateral view of the machine of FIG. 1 with a converging conical twin-screw mixer.

Referring now to the figures, in which the same numbers identify identical elements, FIGS. 1 and 2 represent a mixing and screw-extrusion machine (or "machine") 10 of the invention. The machine 10 includes a converging conical twin-screw mixer (or "mixer") 12 suitable for rubber materials. The mixer 12 includes a fixed frame 14 that supports fixed sleeves (or "sleeves") 16 in which the two screws 18 are mounted. One or more motors 20 rotate the two screws in the sleeves 16 during a mixing cycle. An upper surface of the fixed frame 14 includes guides (not shown) on which the sleeves 16 (without the screws 18) are able to move in a translational movement. The mixer 12 is chosen from commercially available mixers, including those of the type disclosed by the U.S. Pat. No. 7,556,419 and proposed by Colmec S.p.A. In an embodiment, this type of mixer effects mixing and discharge with Archimedes-type screws.

The machine 10 can include an optional conveyor known to the skilled person (for example, the belt 26 shown in FIG. 2) for introducing components through an introduction hopper 24. The components are represented by the mixture M being transported by the belt 26 (see arrow A in FIG. 2). These components can include all types of components necessary for the manufacture of rubber products. During a mixing cycle, the belt 26 (or other equivalent means) is used to successively introduce the raw materials and other necessary ingredients according to a predetermined recipe.

The screws 18 are mounted in the sleeves 16 at an angle between an opening 22 located upstream of the sleeves (where an introduction hopper 24 of the machine 10 feeds the screws 18), and an outlet 25 located downstream of the sleeves (where the mixer 12 discharges the mixture at the end of the mixing cycle). The sleeves 16 can include cooling channels known to manage the temperature of the mixture. The contour of an inner surface 16a of the sleeves 16 is predefined, which makes it possible to determine a distance between each thread and the inner surface of a corresponding sleeve, and thus the shear rate at the inner surface of the sleeves. Similarly, the crests of the threads of the screws contact tangentially the inner surfaces of the sleeves, preventing any retention of mixing material on these surfaces.

In an embodiment of the screws 18, the screws are chosen from profiles known for their self-cleaning nature, including interpenetrated and conjugated profiles (and particularly interpenetrated co-rotative profiles with conjugated profiles). In other words, the screws can be substantially in contact with each other at an angle and at a center distance that effects self-cleaning. The screws are said to be "substantially in contact" when the screws can be cleaned by friction, or when the two screws face each other with such a small gap between them that an extruded material cannot remain attached to the surfaces of the screws. Screws are said to rub against each other, or to be "self-cleaning", when the materials transported in the channel of one of the screws cannot remain in that channel for more than one revolution of the screw. As a result, the material undergoes much more movement in the downstream direction, parallel to the screw axis, than in a lateral direction, perpendicular to the axis. Examples of self-cleaning screws are disclosed by patents EP0160124B1, EP0002131B1, U.S. Pat. Nos. 4,300,839, 4,131,371, and 6,022,133 and by publication WO2016/107527.

Figure 3:
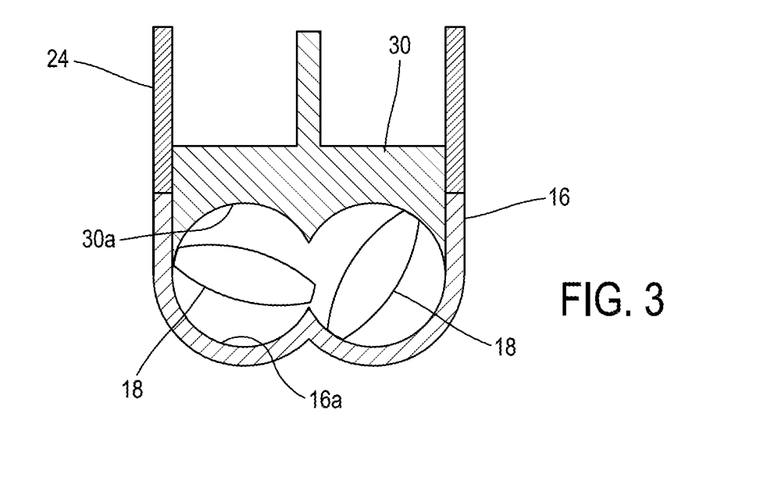
FIG. 3 shows a frontal view, in partial cross-section, of a ram of the machine of the invention in the lowered position.

Referring further to FIGS. 1 and 2 and also to FIG. 3, the machine 10 also includes a ram (or equivalent movable presser) 30 that moves inside the introduction hopper 24. The ram 30 is similar to the rams used during mixing processes such as those realized by Banbury-type internal mixers (as disclosed, for example, by U.S. Pat. Nos. 1,370,398 and 7,404,664). As with these internal mixers, the ram 30 is used to press and exert pressure on the mixture during production. Thus, the ram 30 allows the transmission of more energy and shear to the mixture and thus improves the working of the rubber.

An inner surface 30a of the ram 30 has a shape that is complementary to an outer contour of the two screws 18. The guidance of the ram 30 is realized between a raised position (represented by FIG. 2), where the two screws 18 remain accessible to introduce the mixture, and a lowered position (represented by FIG. 3), where the inner surface 30a of the ram 30 forms an upper part of the mixer 12. The guidance of the ram 30 is effected by known sliding systems such as those used with Banbury rams (driven, for example, by cylinders that can be pneumatic, hydraulic or their equivalents). Thus, in its lowered position, the ram 30 leaves only a very small clearance between the crests of the threads of the screws 18 and its inner surface 30a.

Referring again to FIGS. 1 and 2, the machine 10 includes a roller nose system. Examples of roller nose systems are disclosed by patents FR1563077, FR2282993 and FR3001654. An example of a roller nose system used at the outlet of a converging conical twin screw extrusion machine is disclosed by patents JP4294005 and U.S. Pat. No. 8,517,714.

A roller nose system of an embodiment of the invention includes two counter-rotating rollers 32 arranged just downstream of the outlet 25 to form a sheet of the mixture emerging from the mixer 12. The roller nose system may also include an optional control means (not shown) to control the feeding speed of the mixture to the rollers. The rotation of the rollers 32 is governed by the amount of the mixture supplied by the mixer 12 (detected, for example, by a proximity sensor, by a pressure sensor or by an equivalent device).

Figure 4:
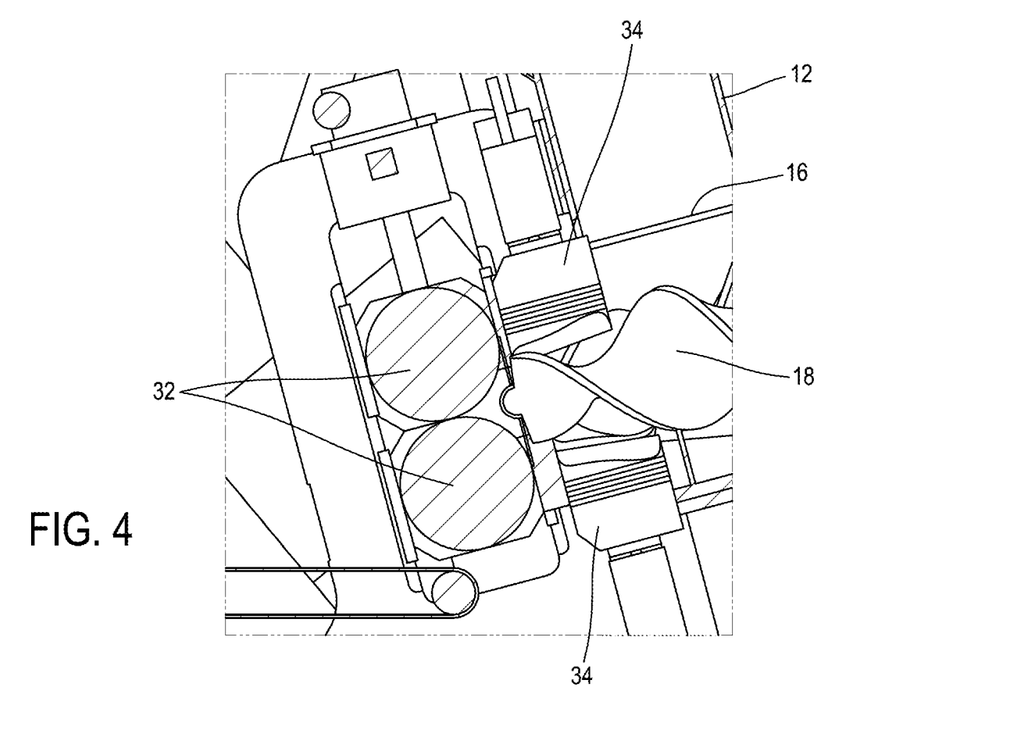
FIG. 4 shows a lateral view, in partial cross-section, of the mixer of FIG. 2, including mobile sleeves.

Referring further to FIGS. 1 to 3 and also to FIG. 4, the machine 10 combines the benefits of the screws 18 and the ram with one or more mobile sleeves such as the mobile sleeves 34 shown in FIG. 4. It is understood that other modes of known mobile sleeves may be used (e. g., left-right and angled modes) (see also examples disclosed by publications WO2009057753 and JPH0550425). The mobile sleeves 34 include mobile elements in order to adjust a predetermined space between the sleeves 16 and the screws 18. Each mobile sleeve has a support surface with a predetermined surface area depending upon the elasticity of the mixture. It is understood that mobile sleeves with different surface areas are interchangeable so as to ensure the use of the machine without having to replace it.

The embodiment shown includes two mobile sleeves 34, but it is understood that only one mobile sleeve (or other equivalent element) or several mobile sleeves (or other equivalent elements) can be integrated (e. g. in top-down mode, left-right mode or angle mode). The mobile sleeves 34 adjust the space between the sleeves and screws in order to facilitate the flow of the mixture inside the mixer 12, thus allowing the duration and the degree of mixing of the mixture to be adjusted.

The two screws 18 circulate the mixture from an upstream side (next to the introduction hopper 24) to a downstream side where the mobile sleeves 34 of machine 10 are installed. The mobile sleeves 34 are installed in relation to the outlet 25 of mixer 12 so that, in an open position, they allow the mixture to be discharged to rollers 32 of the roller nose system. The mobile sleeves can move in an alternative or random manner to reduce the space between the screws and the support surface in a random manner, therefore creating mixing flows from downstream to upstream and preferably on top or bottom. For example, in a manner of using the machine 10, the mobile sleeves 34 are mostly in the open position at the beginning of the mixing cycle when the mixture has a high viscosity (to promote the flow of the mixture), and they are mostly in the closed position at the end of the mixing cycle when the mixture has a lower viscosity (to promote mixing). The guidance of the mobile sleeves 34 is carried out by known systems (actuated, for example, by cylinders that can be pneumatic, hydraulic or their equivalents). The linear movement of the mobile sleeves 34 is governed by the amount of the mixture supplied by the mixer 12 (detected, for example, by a proximity sensor, by a pressure sensor or by an equivalent device).

The use of mobile sleeves allows, from the beginning of the mixing cycle, to have a large air gap and therefore a low pressure drop despite high viscosity. The product to be extruded or mixed passes through the spaces left by the difference in volume between the screw and its sleeves. These spaces, and more particularly the clearance left between the crests of the screw threads and the crests of the sleeve threads (if the sleeve has no thread, the smallest inside diameter is considered), are important for working the product, for its forward speed and for any pressure inside the machine. The product that is subjected to a very high pressure at the end of the screw will seek to move to areas where the pressure is lower. When the product moves through the machine, it will undergo significant shearing, which will promote the work and homogenization of the product. The product can be put into cycle from the beginning.

Figure 5:
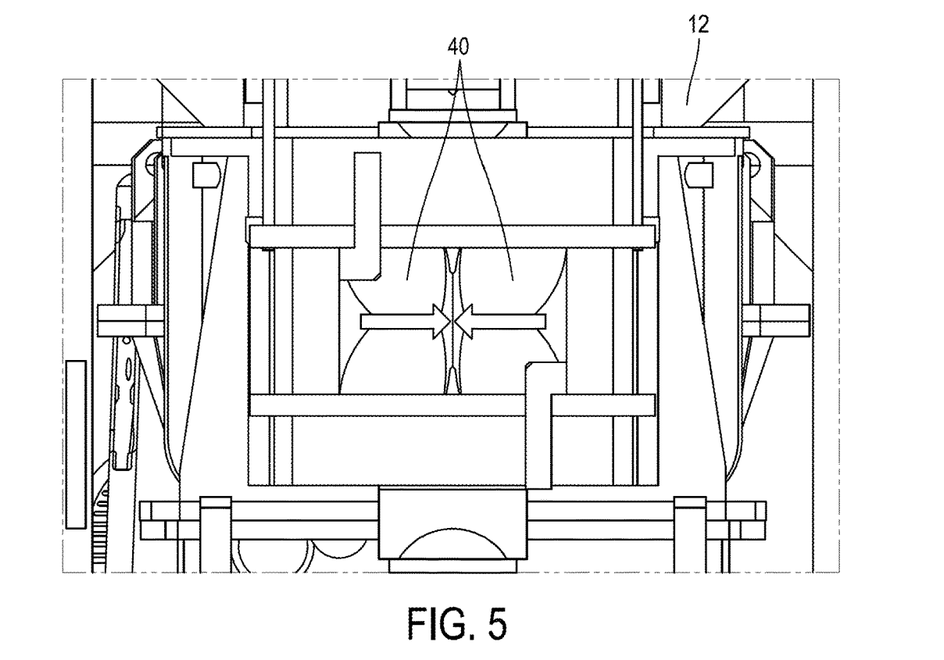
FIGS. 5 and 6 represent partial front views of the machine of FIG. 4 with sliding shutters in the closed and open positions, respectively.
Figure 6:
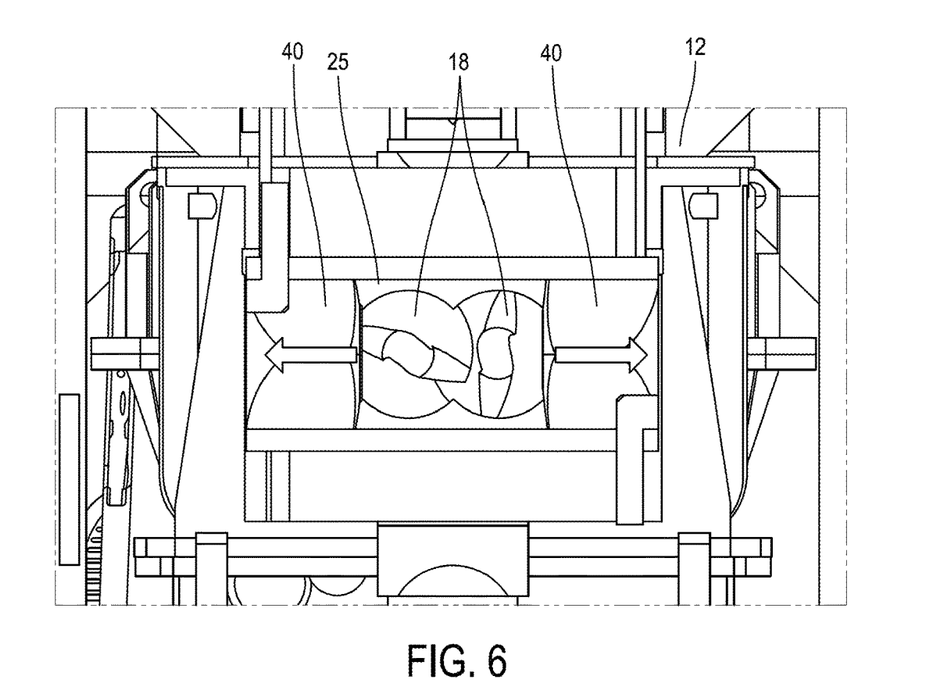

Referring further to FIGS. 1 to 4 and also to FIGS. 5 and 6, FIGS. 5 and 6 show a cross-sectional view of sliding shutters 40, perpendicular to the outlet 25 of the mixer 12. The screws are mounted in the sleeves 16 with removable doors at the end that follow the shape of the screws. To allow the product to be shaped, the removable doors include sliding shutters (or "doors") 40 that are inserted between the rollers 32 and a front face of the mobile sleeves 34 of the machine 10. The sliding shutters 40 include movable elements that regulate the flow of mixture out of the mixer 12. The sliding shutters 40 are installed relative to the mixer outlet 25 so that, in a closed position (see FIG. 5), they prevent the mixture from leaving the mixer 12 (for example, in order to promote mixing when the mixture has a lower viscosity). In an open position (see FIG. 6), the sliding shutters serve as "ears" for the rollers 32, which prevent the mixture from escaping through the sides of the rollers 32. Thus, the mixture is forced to pass between the two rollers and will be calendered in the form of a thin sheet of a predefined width by opening the sliding shutters.

A slide system as known to the skilled person allows the sliding shutters 40 to slide between the closed position (see the arrows in FIG. 5) and the open position (see the arrows in FIG. 6) without the need to move the cylinders positioned behind. The embodiment shown includes two sliding shutters 40, but it is understood that only one sliding shutter (or other equivalent element) or several sliding shutters (or other equivalent elements) can be integrated (for example, in top-down mode, left-right mode or angle mode). The sliding shutters 40 are guided by known systems (actuated, for example, by cylinders that can be pneumatic, hydraulic or their equivalent). The linear movement of the sliding shutters 40 is controlled by the amount of the mixture supplied by the mixer 12 (detected, for example, by a proximity sensor, by a pressure sensor or by an equivalent device). During a mixing cycle, it is possible to partially or fully open the sliding shutters 40.

In an embodiment of the machine 10, a locking system as known to the skilled person can be added in order to improve the closing and therefore the sealing of the sliding shutters 40.

The use of the rollers 32 to produce a sheet optimizes the emptying of the machine 10. In effect, through the adhesion of the product to the rollers 32 and through the "retracting angle" effect, both rollers exert a tensile force on the discharged product. Even when the product is no longer pushed by the screws 18 into the area between the screw ends and the roller gap, the tensile potential of the rollers allows complete evacuation from the area.

Referring to FIGS. 1 to 6, a detailed description is given as an example of a cycle of a mixing process of the invention. It is understood that the process can easily be adapted for all of the different embodiments of the machine 10.

Upon initiating a cycle of the mixing process of the invention, the mixing process includes a step of rotating the screws 18 forward with the sliding shutters 40 closed (see FIG. 5). During this step, the rotating screws cause the product to move downstream of the mixer as soon as the mixture (or raw materials) is introduced into the machine 10.

In all embodiments of the machine 10, the rotational speed can be variable during the cycle.

The mixing process includes a step of introducing a mixture M into the machine 10 (shown as being conveyed by the belt 26 by the arrow A in FIG. 2). During this step, the screws 18 continue to rotate and the sliding shutters 40 remain closed. During this step, the ram 30 remains in its raised position, the rollers 32 remain on standby and the mobile sleeves 34 remain in their open position (that is, with the space between the sleeves and the screws at maximum) (see FIG. 4).

The step of introducing a mixture into the machine 10 can be carried out by introducing into the empty machine the different raw materials necessary for the production of the product, including, without limitation, an elastomeric material (for example, natural rubber, synthetic elastomer and combinations and equivalents thereof) and one or more ingredients, such as one or more processing agents, protective agents and reinforcing charges. Raw materials may also include one or more other ingredients such as carbon black, silica, oils, resins and cross-linking or vulcanization agents. All ingredients are introduced in varying quantities depending on the desired performance of the products obtained from the mixing processes (for example, tires).

The step of introducing a mixture into the machine 10 can also be done by starting the cycle with a product that has already been mixed but does not contain all the ingredients of the recipe (called "masterbatch"). For example, resins and curing agents are not present in the masterbatch. These ingredients, which make mixing difficult, can be added to the mixer 12 to complete mixing. In this case, either the masterbatch is recovered hot from an upstream mixer (such as an internal mixer or an external mixer), or the masterbatch is cold because it has been manufactured and packaged several hours or even several days in advance.

During the mixing cycle, the machine 10 (or a system that incorporates the machine 10) can be trained to recognize values representative of the mixture leaving the mixer 12 (for example, temperature and viscosity values) and to make a comparison with target values. This machine training includes the recognition of non-equivalences between the compared values. Each step of the training can include a classification generated by self-learning means. This classification may include, without limitation, the parameters of the raw materials and masterbatches of the chosen mixing recipe, the screw configurations (either Archimedes or self-cleaning screws), the process cycle times and the values expected at the end of a cycle in progress (for example, the value of the space between the sleeves and the screws during the current mixing cycle, etc.).

During the step of introducing the mixture into the machine 10, the belt 26 (or another equivalent means) is used to successively introduce the necessary raw materials and other ingredients according to a predetermined recipe. In one embodiment, elastomeric material is introduced into the machine 10, followed by the introduction of reinforcing fillers such as carbon black or silica, oils, resins and vulcanizing agents.

In one embodiment, the mixing process includes a step of lowering the ram after the step of introducing the mixture into the machine 10. During this step, the screws 18 continue to rotate and the rollers 32 remain on standby.

The mixing process includes a step of partial closing of the mobile sleeves 34 (either the two mobile elements simultaneously or the two mobile elements alternatively). Partial closing of the mobile sleeves may refer to their reciprocating movement or simultaneous movement. During this step, the screws continue to turn, and the ram remains lowered.

In an embodiment, the mixing process includes a step of raising the ram. During this step, the rollers 32 remain on standby, and the mobile sleeves 34 are in a partially closed position. The screws 18 continue to rotate during this step.

The mixing process includes a step of reversing the screws 18 with the sliding shutters 40 closed (see FIG. 5). During this step, the screws 18 rotate in a direction opposite to that taken by the screws during the step of rotating the screws forward. The entire mixture located in machine 10 has a downstream movement toward an upstream portion of the machine that invokes an additional distribution of raw materials. During this step, the ram 30 remains raised, the rollers 32 remain on standby and the mobile sleeves 34 remain partially closed.

The mixing process includes a step of rotating the screws forward with the sliding shutters 40 closed. During this step, the screws 18 rotate in the opposite direction to the step of turning the screws in reverse. During this step, the ram 30 remains raised, the rollers 32 remain on standby and the mobile sleeves remain partially closed.

In one embodiment, the mixing process includes a step of lowering the ram after the previous step of rotating the screws 18 forward. During this step, the screws 18 continue to rotate, the rollers 32 remain on standby and the moving sleeves 34 remain partially closed.

The mixing process includes a step of completely closing the mobile sleeves 34, thus eliminating the gap between the sleeves 16 and the screws 18. This step includes either simultaneous or alternative closing of the two mobile elements. During this step, the ram 30 is raised again, the screws 18 continue to rotate and the rollers 32 remain on standby. During this step, it is possible to partially or fully open the sliding shutters 40 in order to allow the extrusion of part or all of the mixture in the form of a sheet. The extruded sheet can depart on one or more conveyor systems such as those as described in patent FR3045173 before returning to the mixer 12 through the introduction hopper 24 during a mixing cycle.

The mixing process includes a final step of emptying the machine 10. During this step, the sliding shutters 40 open in order to discharge the mixture from the outlet 25 of the machine toward a downstream process (see FIG. 6). In embodiments of the machine 10 where the sliding shutters include two or more movable elements, this step includes either simultaneous opening or alternative opening of the movable elements. During this step, the ram is lowered, and the rollers 32 are rotated to allow the mixture to be discharged in the form of sheets. The mobile sleeves 34 remain completely closed, but they can be adjusted according to a volume of the mixture discharged from the mixer. The screws 18 continue to rotate during this step so as to completely empty the machine 10 and take the mixture out in the form of a sheet to downstream processes.

At the end of the mixing cycle, the product is finished mixing and can be used in a downstream process (which may be, for example, a palletizing process, a shaping process, and/or another mixing process such as an extrusion process). After the end of the step of emptying the machine 10, the mixing process cycle can be restarted.

The fact that only a part of the mixture may be discharged makes it possible to improve the homogenization capacity of the mixer 12 by breaking the internal flows of the machine and by facilitating the contact of portions of the product during mixing. At the end of the mixing cycle, the sliding shutters can be fully opened, allowing the machine 10 to be completely emptied. The product in the form of a sheet can then be transported to a downstream process.

It is understood that some steps of the cycle, as well as the cycle itself, can be carried out in an iterative manner depending on the chosen mixture recipe.

It is also understood that the machine 10 can operate independently or that it may be part of a system or systems that constitute a production plant.

It is envisaged that the machine 10 can carry out one or more processes concerning the plasticization of natural elastomers.

A process cycle can be performed by PLC control and may include pre-programming of control information. For example, a process setting can be associated with the mixture that is supplied to the mixer 12, including the properties of the screws 18, the properties of the mixture entering the introduction hopper 24 and the properties of the mixture leaving the mixer. An adjustment can be, for example, the opening (either partial or total) and closing (partial or total) of the sliding shutters 40.

For all embodiments of the machine 10, a monitoring system can be put in place. At least part of the monitoring system may be provided in a portable device such as a mobile network device (for example, a mobile phone, a portable computer, a portable device or devices connected to a network, including augmented reality and/or virtual reality devices, portable clothing connected to the network and/or any combinations and/or equivalents thereof).

In some embodiments of the invention, the machine 10 (and/or a system that incorporates the machine 10) may receive voice commands or other audio data representing, for example, a start or a stop of the rotation of the screws 18. The request may include a request for the current status of a mixing process cycle. A generated response can be represented in an audible, visual, tactile (for example, using a haptic interface) and/or virtual or augmented manner.

In some embodiments of the invention, the machine 10 (and/or a system that incorporates machine 10) may receive voice commands or other audio data representing, for example, a step or stop in the rotation of screws 18. The request may include a request for the current status of a mixing process cycle. A generated response can be represented in an audible, visual, tactile (e. g. using a haptic interface) and/or virtual or augmented manner.

To obtain mixtures with the desired properties, the invention preserves all of the advantages of a mixer equipped with a converging conical twin-screw mixer. At the same time, the invention combines sliding shutter solutions to provide a single machine that is capable of processing a variety of mixtures without changing equipment in a mixing facility.

The terms "at least one" and "one or more" are used interchangeably. The ranges that are presented as "between a and b" include the values "a" and "b".

Although specific embodiments of the disclosed apparatus have been illustrated and described, it is understood that various changes, additions and modifications can be made without departing from the spirit and scope of this presentation. Therefore, no limitation should be imposed on the scope of the described invention with the exception of those set out in the annexed claims.

The invention claimed is:

1. A mixing and extrusion machine (10) for the production of rubber mixtures, the machine (10) comprising:
    a converging conical twin-screw mixer (12) with a fixed frame (14) that supports sleeves (16) in which two screws (18) are mounted at an angle between an opening (22) disposed upstream of the sleeves, where an introduction hopper (24) of the machine (10) feeds the screws, and an outlet (25) disposed downstream of the sleeves, where the mixer (12) discharges the mixture at the end of a mixing cycle, one or more motors (20) that rotate the two screws in the sleeves during the mixing cycle, and one or more removable doors provided at the outlet (25) to allow, during the mixing cycle, the discharge and shaping of a rubber mixture,
    wherein the screws are mounted in the sleeves (16) with the removable doors that conform to the shape of the screws, the removable doors comprising sliding shutters (40) installed relative to the outlet (25) so that the sliding shutters move linearly between a closed position, in which the sliding shutters prevent the mixture from exiting the mixer (12), and an open position, in which the sliding shutters prevent the discharge of the mixture through the sides of two counter-rotating rollers (32) of a roller nose system arranged just downstream of the outlet (25) in order to force the mixture to pass between the two rollers and to form a sheet of the mixture at a predefined thickness and width discharged from the mixer (12).

2. The machine (10) of claim 1, further comprising a ram (30) with an inner surface (30a) having a shape that is complementary to an outer contour of the two screws (18), the ram moving inside the introduction hopper (24) between a raised position, where the two screws remain accessible for introducing the mixture, and a lowered position, where the inner surface (30a) of the ram forms an upper part of the mixer (12).

3. The machine (10) of claim 1, further comprising one or more mobile sleeves (34) that are arranged in a top-down mode towards the outlet (25), each mobile sleeve with a support surface with a predetermined surface area according to an elasticity of the mixture, and the mobile sleeves (34) comprising mobile elements that move by a linear movement with respect to the outlet (25) to adjust a predetermined space between the sleeves and screws, and the linear movement being defined between a closed position of the mobile sleeves to facilitate mixing, and an open position of the mobile sleeves so as to facilitate the flow of the mixture inside the mixer.

4. The machine (10) of claim 1, wherein the screws (18) are mounted in the mixer (12) so that the crests of each screw thread are tangent to the surfaces of the opposite screw so that the screws remain substantially in contact with each other when rotating the screws at an angle and a center distance that facilitates self-cleaning.

5. The machine (10) of claim 4, wherein the screws (18) are selected from interpenetrated and conjugated profiles, including interpenetrated co-rotative profiles with conjugated profiles.

6. The machine (10) of claim 1, wherein the sleeves (16) include cooling channels to manage the temperature of the mixture during the mixing cycle.

7. A mixing process of the type comprising a step of mixing and extruding a rubber mixture from the machine (10) of claim 1, the process comprising the following steps:
    a step of rotating the screws (18) forward with the sliding shutters (40) closed;
    a step of introducing the mixture to the machine (10), during which the screws (18) continue to rotate and the sliding shutters (40) remain closed; and
    a machine emptying step (10), during which step the sliding shutters (40) open to discharge the mixture from the machine outlet (25) toward a downstream process and in which step the screws continue to rotate until the mixer is empty.

8. The process of claim 7, in which the step of introducing the mixture to the machine (10) comprises introducing the raw materials to form the mixture.

9. The process of claim 7, in which the step of introducing the mixture to the machine (10) includes the introduction of one or more masterbatches.

10. The process of claim 7, in which:
- the sliding shutters (40) are in the closed position at the beginning of the mixing cycle and in the open position at the end of the mixing cycle; and
- the mobile sleeves (34) are in the open position at the beginning of the mixing cycle and in the closed position at the end of the mixing cycle.

\* \* \* \* \*